United States Patent [19]
Choi

[11] Patent Number: 5,383,067
[45] Date of Patent: Jan. 17, 1995

[54] CONTROL SIGNAL REPRODUCING CIRCUIT

[75] Inventor: Nag-eui Choi, Ansan-city, Rep. of Korea

[73] Assignee: Samsung Electronics Co., Ltd., Kyunggi-do, Rep. of Korea

[21] Appl. No.: 876,376

[22] Filed: Apr. 30, 1992

[30] Foreign Application Priority Data

Jul. 15, 1991 [KR] Rep. of Korea .................. 91-12330

[51] Int. Cl.$^6$ ............................................ G11B 15/18
[52] U.S. Cl. ...................................... 360/72.2; 360/30
[58] Field of Search ................ 360/29, 30, 69, 72.1, 360/72.2, 27; 358/93, 101, 106, 107; 356/380

[56] References Cited

U.S. PATENT DOCUMENTS

| | | | |
|---|---|---|---|
| 3,096,443 | 7/1963 | Laycak | 358/106 |
| 4,556,903 | 12/1985 | Blitchington et al. | 358/107 |
| 5,128,753 | 7/1992 | Lemelson | 360/72.1 |

Primary Examiner—John T. Kwon
Assistant Examiner—Christopher Verdier
Attorney, Agent, or Firm—Sughrue, Mion, Zinn, Macpeak & Seas

[57] ABSTRACT

A control signal reproducing circuit which, during a VISS operation, clips a reproduced residual signal at a certain level or, controls a feedback amount of a control pulse by varying a pole value in order to reduce the cut-off frequency and (suppress high band components, thereby reducing the reproduced gain of the residual signal and preventing faulty VISS operation due to the residual signal.

5 Claims, 6 Drawing Sheets

+Vth
−Vth

CONTROL SIGNAL REPRODUCING CIRCUIT

BACKGROUND OF THE INVENTION

The present invention relates to a control signal reproducing circuit in a magnetic recording and reproducing apparatus having a VISS function, which performs a normal VISS operation by clipping a residual signal having gain incidentally increased according to an increase of tape speed at a certain level, or by suppressing the high band by way of a band adjustment.

Generally, in a video cassette recorder (VCR), during the fast forward (FF)/rewind (REW) mode a capstan motor rotates at N times the normal playback speed according to the equation $v = r \times \omega$ in which the linear velocity (v) of the tape is varied according to the amount of wound tape. Thus, the frequency of a control pulse reproduced by a control head is a maximum at the end of the tape during the FF mode, and is also at a maximum at the beginning of the tape during the REW mode. Further, since the magnitude of a reproduced control pulse is proportional to the variation of magnetic flux density, the faster the tape's linear velocity is, the greater the magnitude of the control pulse becomes, as well as the higher its frequency. That is, the effective electromagnetic force (emf) is calculated by: $emf(\omega) = j\omega \times \phi(\omega)$ where, $\phi(\phi) =$ magnetic flux density.

In general a VISS (video index search system) function is designed to facilitate searching of the contents of a certain recording portion by recording index information on a tape by using the variation of the duty cycle of a control pulse employed to control the phase of the capstan.

However, during a VISS overwriting operation to record the index information on a tape, the previous control track's signal is not completely removed and remains as a residual signal. The residual signal has its gain greatly increased because the tape speed becomes fast during such a VISS operation as introscan or index search, which results in faulty VISS operation. An index search operation is provided to recognize an index-signal-recorded portion and perform a playback operation when searching (by using a FF or REW function) an index signal recorded by varying the duty cycle of the control pulse. An introscan operation performs playback for five seconds in the index-signal-recorded portion, and then re-initiates a FF or REW operation to search the next index-signal-recorded portion.

Figure 1:
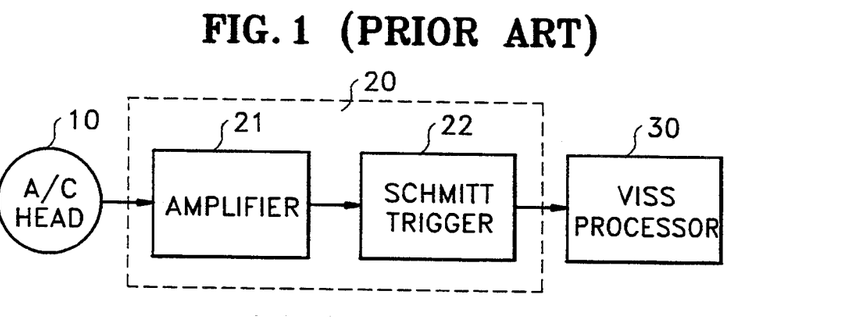
FIG. 1 is a block diagram of a conventional control signal reproducing circuit of a video cassette recorder having a VISS function.

That is, as shown in FIG. 1, a control pulse reproduced from a control track by an A/C head 10 in a conventional VCR is converted into a square wave by a schmitt trigger 22 via an amplifier 21. Amplifier 21 and schmitt trigger 22 are servo circuits composed of ICs.

Figure 2A:
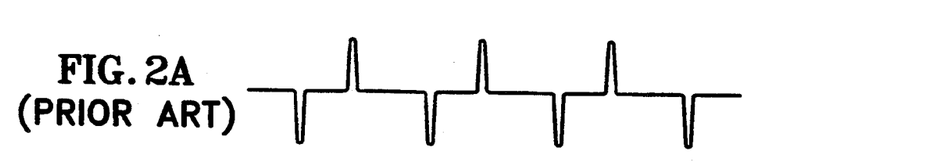
FIGS. 2A–2F illustrate the control pulse relating to the circuit shown in FIG. 1.
Figure 2B:
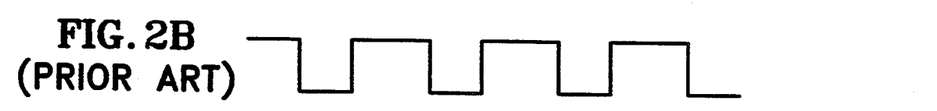
Figure 2C:
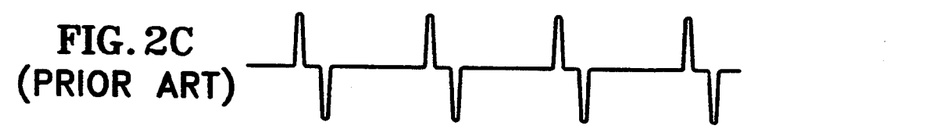
Figure 2D:
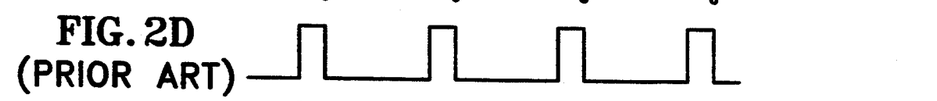

During normal playback, a control pulse (FIG. 2A) is recorded to maintain about a 60% duty cycle, and FIG. 2B shows the output of schmitt trigger 22 which processes the control pulse shown in FIG. 2A. During the recording of an index signal for VISS operation, a control pulse (FIG. 2C) is recorded to maintain about a 30% duty cycle by moving the negative-going pulse, and FIG. 2D shows the output of schmitt trigger 22 which processes the control pulse shown in FIG. 2C.

Figure 2E:
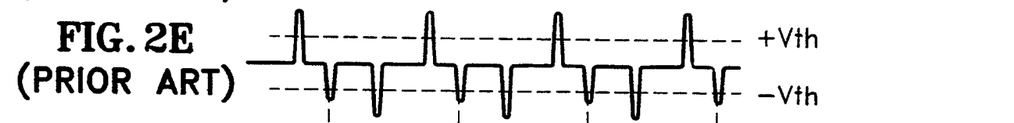
Figure 2F:
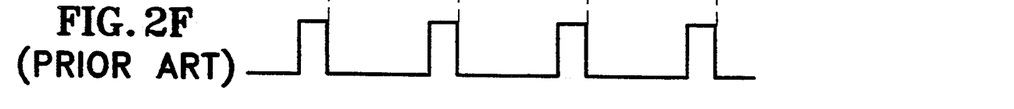

However, as shown in FIG. 2E, during the overwriting of an index signal for VISS operation, the negative-going control pulse previously recorded on the control track is not sufficiently removed and remains as a residual signal; the effects of which are shown in FIG. 2F.

That is, in a VHS mode, the ratio of the main signal level to the residual signal level should be over 20 dB during recording. However, during playback, different from recording, if the playback is a fast speed playback such as a VISS operation (FF or REW mode), the gain level of the residual signal becomes greater than the triggering voltage level of the schmitt trigger (particularly at the beginning and end of a tape). This means that, as seen in FIG. 2E, the residual signal remains, which in turn creates a control pulse having the improper duty cycle for the VISS format because, during fast playback, the gain of the residual signal increases so that its level is greater than the triggering level of the schmitt trigger. This causes faulty operation.

SUMMARY OF THE INVENTION

Therefore, it is an object of the present invention to provide a control signal reproducing circuit in a magnetic recording and reproducing apparatus having a video search function which prevents a faulty operation due to the increase of the gain of a residual signal according to tape speed increase by clipping the residual signal or by adjusting its bandwidth to suppress the high band.

To accomplish the object, according to one aspect of the present invention, there is provided a control signal reproducing circuit in a magnetic recording and reproducing apparatus having a video search function which varies the duty cycle of a control signal recorded on a control track of a magnetic tape via a control head to record video search information and, during a video search mode, checks the duty cycle of the control signal to read out the recorded video search information, the control signal reproducing circuit comprising:

amplifier means for amplifying a reproduced control signal picked up via the control head;

waveform-shaping means for comparing the reproduced control signal amplified by the amplifier means with a reference signal to be wave-shaped; and clipping means for, during the video search mode, clipping the reproduced control signal at a certain signal level which is higher than that of the residual signal to eliminate the residual signal remaining on the control track, and for supplying the clipped signal to the waveform-shaping means, whereby a faulty operation due to the residual signal during the video search mode is prevented.

According to another aspect of the present invention, there is provided a control signal reproducing circuit used in a magnetic recording and reproducing apparatus having a video search function which varies the duty cycle of a control signal recorded on a control track of a magnetic tape via a control head to record video search information and, during a video search mode, checks the duty cycle of the control signal to read out the recorded video search information, the control signal reproducing circuit comprising:

amplifier means for amplifying a reproduced control signal picked up via the control head;

waveform-shaping means for comparing the reproduced control signal amplified by the amplifier means with a reference signal to be wave-shaped; and feedback means connected between the input and output of the amplifier means for, during the video search mode, reducing the cut-off frequency of the amplifier means to suppress a residual signal remaining on the control track, and otherwise restoring the cut-off frequency, whereby a faulty operation due to the residual signal is prevented during the video search mode.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 3:
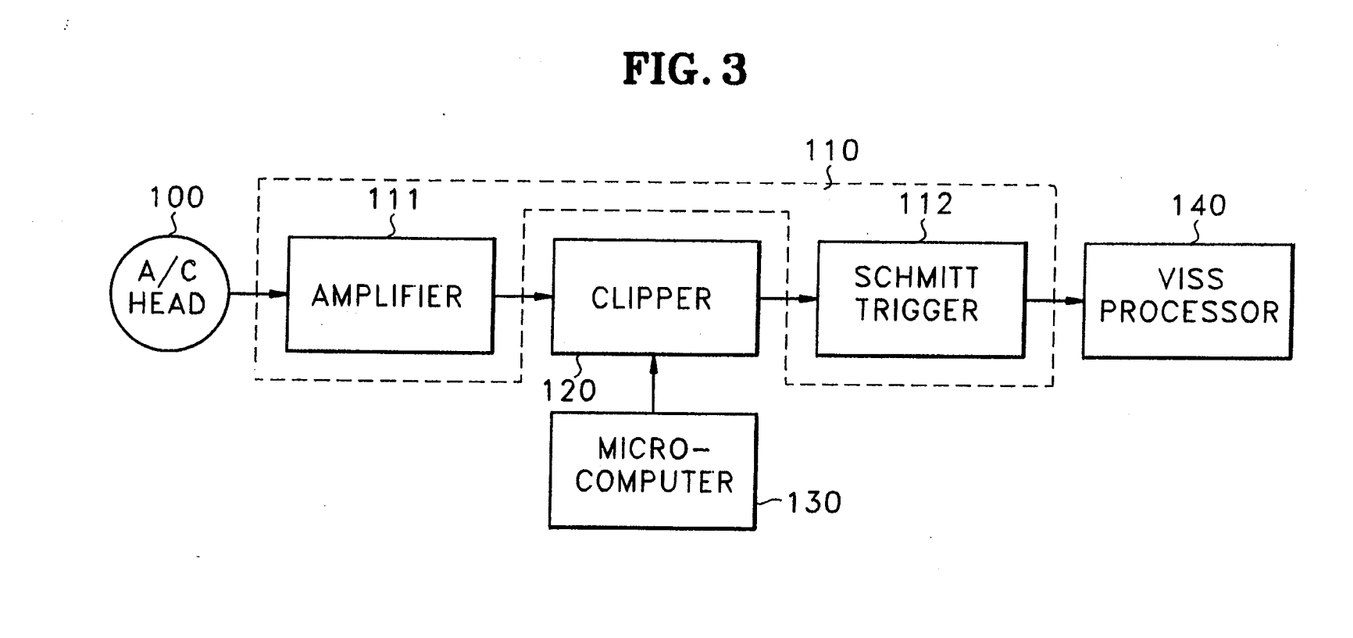
FIG. 3 is a block diagram of one embodiment of a control signal reproducing circuit according to the present invention.

Referring to FIG. 3, a control pulse picked up by an A/C (audio/control) head 100 is amplified by an amplifier 111 of a capstan servo IC 110. A clipper 120 clips the output of amplifier 111 under the control of a microcomputer 130. The output of clipper 120 is applied to a VISS processor 140 via a schmitt trigger 112 of servo IC 110.

During VISS mode and FF/REW operation, microcomputer 130 senses the state of VCR operation and outputs a control signal for operating clipper 120 so that the control pulse is clipped, thereby providing a clipped control pulse to schmitt trigger 112. Except for such a case, the clipper 120 does not operate thereby directly sending the control pulse reproduced by A/C head 100 to schmitt trigger 112.

Figure 4:
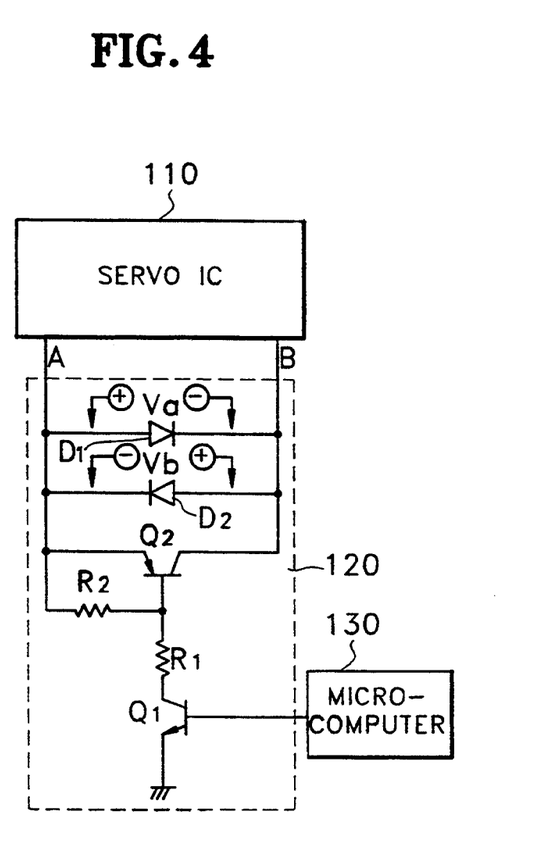
FIG. 4 is a more detailed illustration of the control signal reproducing circuit shown in FIG. 3.

Referring to FIG. 4, a port A of servo IC 110 through which a control pulse is reproduced by A/C head 100 and output via amplifier 111 of FIG. 3, is connected to the anode of a diode $D_1$, the cathode of a diode $D_2$, and the emitter of a transistor $Q_1$, while a port B (the input of schmitt trigger 112 of FIG. 3) is connected to the cathode of diode $D_1$, the anode of diode $D_2$, and the collector of transistor $Q_2$. The base of a transistor $Q_1$ is connected to the control signal output port of microcomputer 130, while its collector is connected to one end of a resistor $R_1$ which is tied to the base of transistor $Q_2$, and its emitter is grounded. A bias resistor $R_2$ is connected between the base and emitter of transistor $Q_2$.

Now, the operation of FIG. 4 will be described with reference to FIG. 3 and FIGS. 7A–7D.

First, microcomputer 130 applies a low signal to the base of transistor $Q_1$ during a FF/REW mode (VISS search), and otherwise applies a high signal. Thus, during VISS operation, since the current flow of transistor $Q_1$ is turned off, that of transistor $Q_2$ is also turned off.

Figure 7A:
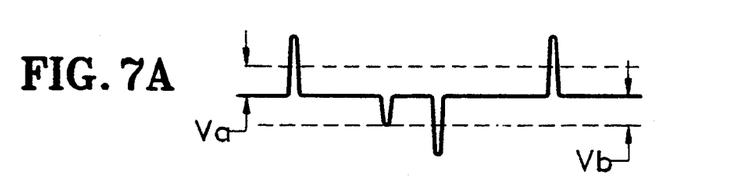
FIGS. 7A–7D illustrate operational waveform diagrams of the control signal reproducing circuit shown in FIG. 4.
Figure 7B:
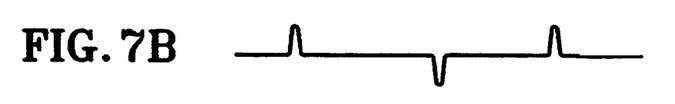
Figure 7C:
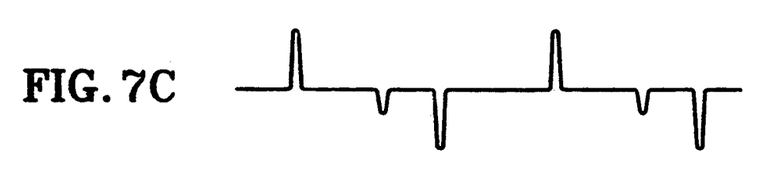
Figure 7D:
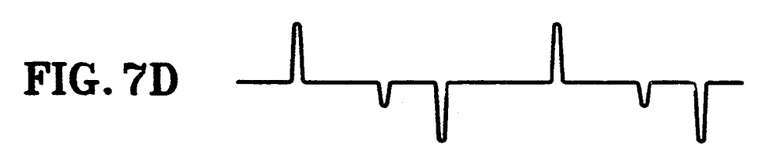

Here, an amplified control pulse is output from port A which is the input of amplifier 111 of servo IC 120 shown in FIG. 3. The control pulse below a certain level is clipped by diodes $D_1$ and $D_2$ and applied to the port B which is the input of schmitt trigger 112. More specifically, the control pulse output from port A of servo IC 110 contains a residual signal as shown in FIG. 7A, but the control pulse below a certain level is clipped by diodes $D_1$ and $D_2$, so that a control pulse as shown in FIG. 7B is applied to the schmitt trigger input (port B). Clipping voltages Va and Vb (FIG. 7A) of diodes $D_1$ and $D_2$, respectively, are 0.7 V in the case of silicon diodes and 0.3 V for germanium diodes.

Therefore, during a FF/REW mode of VISS operation, since transistors $Q_1$ and $Q_2$ are turned off, the residual signal contained in the control pulse is clipped below clipping values Va and Vb and a control pulse with no residual signal (FIG. 7B) is input to port B of servo IC 110. Otherwise however, since microcomputer 130 outputs a high signal so that the transistors $Q_1$ and $Q_2$ are turned on, the control pulse (FIG. 7C) output from port A of servo IC 110 is directly input to port B of servo IC 110 via the turned-on transistor $Q_2$, to result in the waveform shown in FIG. 7D. Here, since the residual signal is sufficiently small due to the slow tape speed and cannot trigger schmitt trigger 112 of servo IC 110, the residual signal bypasses through transistor $Q_2$.

Hence, during VISS operation, the residual signal is clipped by diodes $D_1$ and $D_2$ to prevent faulty operation due to the residual signal.

Figure 5:
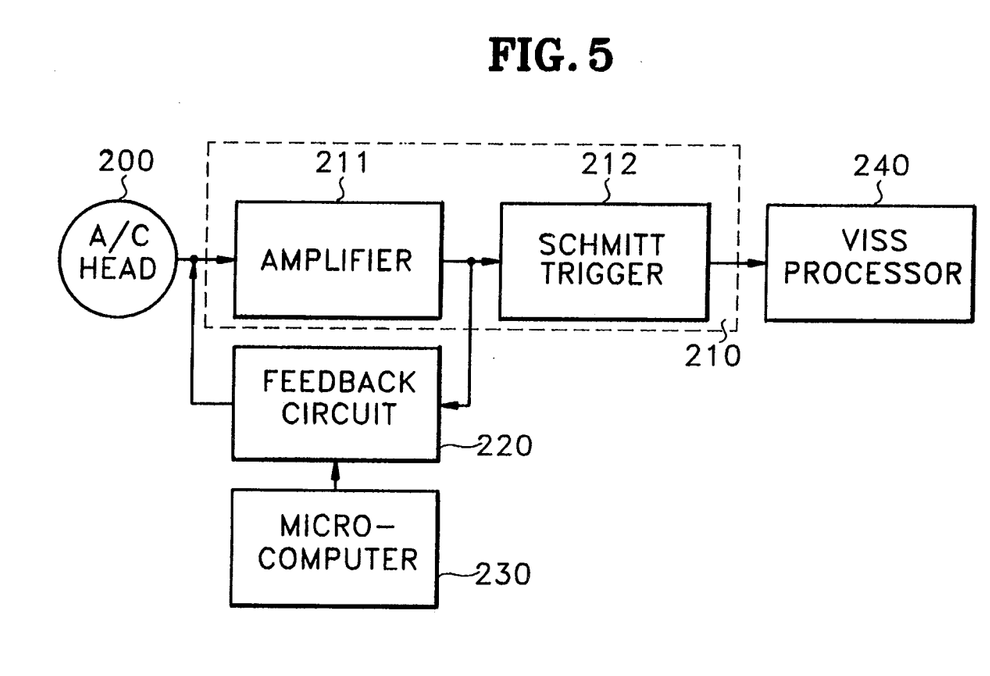
FIG. 5 is a block diagram of another embodiment of a control signal reproducing circuit according to the present invention.

Referring to FIG. 5, the bandwidth of the output signal of amplifier 211 of servo IC 210 which receives a control pulse picked up by A/C head 200 is limited by a feedback circuit 220 and is added to the picked-up control signal to be fedback to amplifier 211. Feedback circuit 220 is constructed such that bandwidth is controlled by changing the cut-off frequency of amplifier 211 under the control of microcomputer 230.

Figure 6:
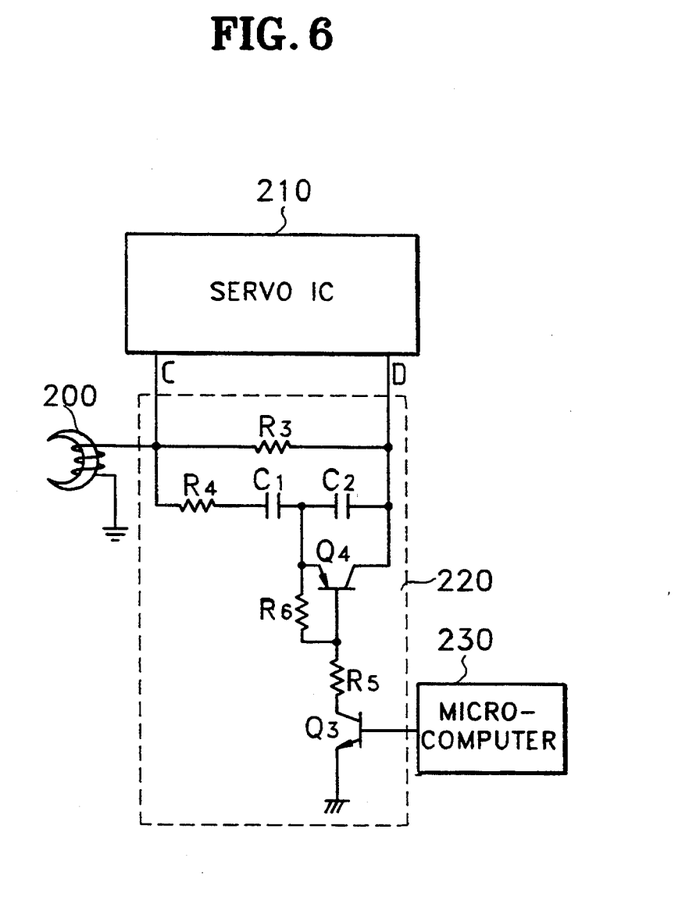
FIG. 6 is a more detailed illustration of the control signal reproducing circuit shown in FIG. 5.

Referring to FIG. 6, a servo IC 210 has a port C (the input of amplifier 211 of FIG. 5) for receiving a control pulse from A/C head 200, and a port D (tied to the input of schmitt trigger circuit 212 of FIG. 5) for receiving an amplified control pulse. A resistor $R_3$ is connected between ports C and D of servo IC 210. A resistor $R_4$ and capacitors $C_1$ and $C_2$ all in series are also connected between ports C and D, and in parallel with resistor $R_3$. The base of a transistor $Q_3$ is connected to the output of microcomputer 230, while its collector is connected to a bias resistor $R_5$ which is tied to the base of a transistor $Q_4$, and its emitter is grounded. A bias resistor $R_6$ is connected between the base and emitter of a transistor $Q_4$, while capacitor $C_2$ is connected between its collector and emitter.

The, operation of FIG. 6 will now be described with reference to FIG. 5 and FIGS. 7E–7F.

Referring to FIG. 6, a control pulse picked up by A/C head 200 is added to a fedback output from feedback circuit 220 and is applied to port C of servo IC 210. The control pulse amplified by amplifier 211 consisting of an operational amplifier, is fedback by feedback circuit 220. The microcomputer 230 outputs a low signal during VISS operation and otherwise outputs a high signal. Therefore, with transistors $Q_3$ and $Q_4$ turned off during VISS operation, the total capacitance ($C_f$) of the series capacitors $C_1$ and $C_2$ of feedback circuit 220 is $$C_f = \frac{C_1 \cdot C_2}{C_1 + C_2}$$

so that the value of the filter's pole is varied according to $C_f$ of feedback circuit 220. The controlled pole value $f_p$ is $$f_p = \frac{1}{2\pi (R_3 + R_4) \cdot C_f}$$

and if $R_3 > R_4$, then $$f_p = \frac{1}{2\pi R_3 \cdot C_f}$$

Therefore, bandwidth can be freely controlled by the capacitance adjustment of capacitor $C_2$.

Figure 7E:
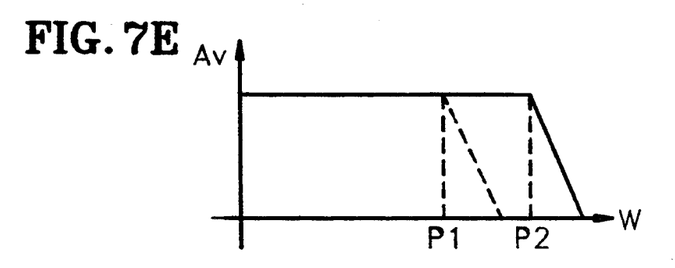
FIGS. 7E and 7F illustrate the operation of the control signal reproducing circuit shown in FIG. 6.

As shown in FIG. 7E, since, if $C_2 > C_1$, $C_2$ determines $P_1$ and $C_1$ determines $P_2$. As a result, the greater the capacitance of capacitor $C_2$ is, the smaller the bandwidth is. Thus, even if tape speed increases, when the bandwidth is narrowed by adjusting the capacitance of capacitor $C_2$, the high frequency component is suppressed, so that the faster the tape speed is, the more the signal level is lowered. This reduces the gain of the residual signal to prevent faulty operation.

Meanwhile, modes other than a VISS mode of operation, microcomputer 230 outputs a high signal which causes transistors $Q_3$ and $Q_4$ to turn on so that capacitor $C_2$ becomes ineffective (i.e., shorted) and the pole of feedback circuit 220 is fixed according to $C_1$. The pole is determined by capacitor $C_1$ and a value P is calculated as $$P = \frac{1}{2R_1C_1}$$

Figure 7F:
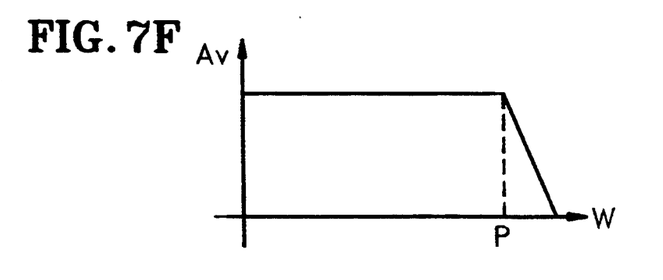

Therefore, the pole value is determined by value P which is shown in FIG. 7F.

As described above in detail, during a VISS operation and FF/REW mode, the control signal reproducing circuit of the present invention can eliminate a faulty VISS operation due to a residual signal, by clipping (suppressing) the residual signal or limiting (adjusting) the control signal's bandwidth. The control signal reproducing circuit according to the invention is especially applicable to a VCR which performs a standard VISS operation according to VHS format.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A control signal reproducing circuit in a magnetic recording and reproducing apparatus having a video search function which varies a duty cycle of a control signal recorded on a control track of a magnetic tape via a control head to record video search information and, during a video search mode, checks the duty cycle of the control signal to read out the recorded video search information, said control signal reproducing circuit comprising:

amplifier means for amplifying a reproduced control signal picked up by said control head;

waveform-shaping means for comparing the reproduced control signal amplified by said amplifier means with a reference signal to wave-shape the reproduced amplified control signal; and clipping means operable during the video search mode for clipping the reproduced amplified control signal at a certain signal level which is higher than that of a residual signal remaining on the control track, thereby eliminating the residual signal, and for supplying the clipped signal to said waveform-shaping means so that a faulty operation due to the residual signal is prevented during the video search mode;

wherein said clipping means comprises:

first and second diodes connected in parallel and oriented in opposite directions to each other, each of said first and second diodes being connected between an output of said amplifier means and an input of said waveform-shaping means;

a first transistor whose base receives a control signal during the video search mode, whose collector is connected to one end of a first bias resistor, and whose emitter is grounded; and a second transistor having a second bias resistor connected between the other end of said first bias resistor and its emitter, whose base is connected to said other end of said first bias resistor, and whose collector and emitter are connected to said output of said amplifier means and said input of said waveform-shaping means, respectively.

2. A control signal reproducing circuit as claimed in claim 1, wherein, during VISS mode, said first and second transistors are turned off so that said first and second diodes clip a control pulse below a certain level, and, during a mode when said first and second transistors are turned on, the control signal amplified by said amplifier means is directly output to said waveform-shaping means via said second transistor, thereby bypassing said first and second transistors.

3. A control signal reproducing circuit in a magnetic recording and reproducing apparatus having a video search function which varies a duty cycle of a control signal recorded on a control track of a magnetic tape via a control head to record video search information and, during a video search mode, checks the duty cycle of the control signal to read out the recorded video search information, said control signal reproducing circuit comprising:

amplifier means for amplifying a reproduced control signal picked up via said control head;

waveform-shaping means for comparing the reproduced control signal amplified by said amplifier means with a reference signal so as to wave-shape the reproduced amplified control signal; and feedback means connected between an input and an output of said amplifier means for, during the video search mode, reducing a cut-off frequency of said amplifier means to suppress a residual signal remaining on said control track, and, during a mode which is different from the video search mode, for maintaining the cut-off frequency of said amplifier means so that a faulty operation due to the residual signal is prevented during the video search mode;

wherein said feedback means comprises:

a first resistor connected between the input and output of said amplifier means;

a first series circuit comprising a second resistor and first and second capacitors connected in series with said second resistor, said first series circuit being connected in parallel with said first resistor;

a first transistor whose base receives a video search mode control signal, whose collector is connected to one end of a third bias resistor, and whose emitter is grounded, said first transistor being turned on according to a VISS mode control signal; and a second transistor whose base is connected to the other end of said third bias resistor, whose collector and emitter are connected across said second capacitor, and whose base and emitter are connected across a fourth bias resistor.

4. A control signal reproducing circuit as claimed in claim 3, wherein a pole value of said feedback means is varied according to a capacitance of said second capacitor so as to lower the cut-off frequency of said feedback means and thereby control its bandwidth.

5. A control signal reproducing circuit as claimed in claim 4, wherein, during a VISS mode, each of said first and second transistors is turned off to vary a pole value of said feedback means so as to suppress high band components, and, during a mode when each of said first and second transistors is turned on, the control signal picked up by said control head is directly output to said waveform-shaping means via said second transistor so as to maintain an original pole value of said feedback means.

* * * * *